PETER F. RANDOLPH.
Improvement in Nut-Locks.
No. 114,474.
Patented May 2, 1871.
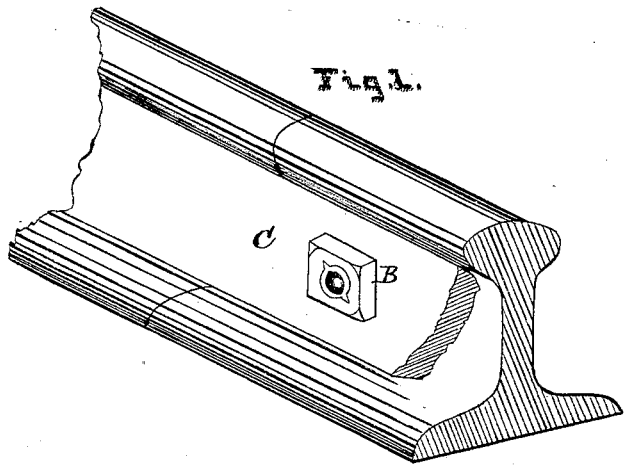
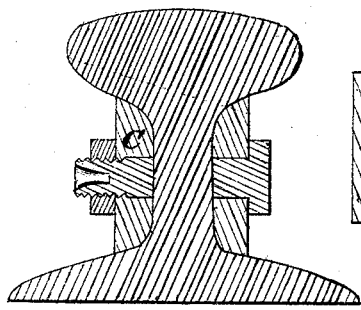
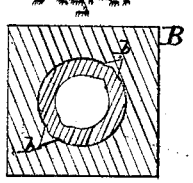
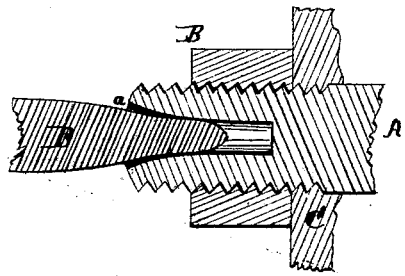
Witnesses:
Inventor

United States Patent Office.

PETER F. RANDOLPH, OF JERSEYVILLE, ILLINOIS.

Letters Patent No. 114,474, dated May 2, 1871; antedated April 25, 1871.

IMPROVEMENT IN NUT-LOCKS.

The Schedule referred to in these Letters Patent and making part of the same.

*To all whom it may concern:*

Be it known that I, PETER F. RANDOLPH, of Jerseyville, in the county of Jersey and State of Illinois, have invented a new and improved Nut-Lock; and I do hereby declare that the following is a full and exact description of the same, reference being had to the accompanying drawing and to the letters of reference marked thereon.

This invention has for its object the production of a device for the locking or securing of the nuts on the bolts of fish-plate joints, in order that they may not be loosened and caused to fall off by the jarring action consequent upon the passage of the trains, and consists in the combination of a nut provided with sharp-edged notches with a bolt having an opening in its thread end, as will be fully described hereinafter.

In the drawing—

Figure 1 represents a perspective of the rail-joint, and

Figures 2, 3, and 4, sectional views of the nut-lock in position and detached.

To enable others skilled in the art to which my invention appertains to make and use the same, I will now proceed to describe fully its construction and operation.

A represents a bolt, which is constructed in the ordinary manner, excepting that it is provided in its thread end with a bell-shaped opening, as shown at $a$;

B represents a nut, which may be constructed in the usual manner, but is preferably made with the notches $b\ b$, as shown;

C represents the fish-plate; and

D represents a drift by means of which the opening in the end of the bolt is expanded after the nut is in place.

The opening in the bolt is made bell-shaped instead of tapering, to correspond with the drift, in order that the bolt may not be split by the action of the drift.

The operation will be readily understood:

The bolts, nuts, and fish-plates are used in the ordinary manner to secure the ends of the adjacent rails.

After the nut is in place the drift is driven into the opening in the bolt until the latter is sufficiently expanded to hold the nut.

It will be observed that, by the expansion of the end of the bolt, the nut is not only held by the riveting, as it were, of the bolt over its edges, but it is also held by the projecting of a portion of the bolt into the notches of the nut. The latter should be made of hardened steel, in order that the sharp edges of its notches may possess sufficient strength to cut away the projections upon the bolt when it is desired to take it off.

I do not claim a bolt having a recess in its thread end; but

Having thus fully described my invention,

What I claim, and desire to secure by Letters Patent of the United States, is—

The combination of the hardened-steel nut B, with its sharp-edged notches $b\ b$, with the bolt A, as described.

This specification signed and witnessed this 1st day of October, 1870.

PETER F. RANDOLPH.

Witnesses:
J. E. McCLURE,
M. B. MINER.